United States Patent
Tomioka

(10) Patent No.: US 11,588,944 B2
(45) Date of Patent: Feb. 21, 2023

(54) COMMUNICATION SYSTEM, SERVER SYSTEM, AND COMMUNICATION APPARATUS, RELATING TO PERMISSION TO EXECUTE A NEWLY ADDED FUNCTION

(71) Applicant: CANON KABUSHIKI KAISHA, Tokyo (JP)

(72) Inventor: Yu Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/361,953

(22) Filed: Jun. 29, 2021

(65) Prior Publication Data

US 2022/0006911 A1 Jan. 6, 2022

(30) Foreign Application Priority Data

Jul. 2, 2020 (JP) .............................. JP2020-115060

(51) Int. Cl.
*H04N 1/00* (2006.01)
*G06F 3/12* (2006.01)
*G06F 8/65* (2018.01)
*G10L 15/22* (2006.01)

(52) U.S. Cl.
CPC ........... *H04N 1/00403* (2013.01); *G06F 8/65* (2013.01); *G10L 15/22* (2013.01); *H04N 1/00344* (2013.01); *G10L 2015/223* (2013.01); *G10L 2015/225* (2013.01)

(58) Field of Classification Search
CPC ........... H04N 1/00403; H04N 1/00344; H04N 1/4413; H04N 1/00103; H04N 1/00278; H04N 1/00315; H04N 1/00392; H04N 1/00411; H04N 1/04; G06F 8/65; G06F 3/1224; G06F 3/1238; G06F 3/126; G06F 3/1267; G06F 3/1288; G06F 3/167; G06F 3/1204; G06F 3/1203; G06F 3/1236; G06F 3/1268; G06F 3/1279; G06F 3/128; G10L 15/22; G10L 2015/223; G10L 15/30

See application file for complete search history.

(56) References Cited

U.S. PATENT DOCUMENTS

| 2011/0054908 | A1* | 3/2011 | Matsuda | ................. G10L 15/26 704/275 |
|---|---|---|---|---|
| 2019/0079703 | A1 | 3/2019 | Tokuchi | |
| 2019/0155551 | A1 | 5/2019 | Fukumoto | |
| 2019/0156825 | A1* | 5/2019 | Shiga | ....................... G06F 3/167 |

FOREIGN PATENT DOCUMENTS

JP 2019046102 A 3/2019

* cited by examiner

*Primary Examiner* — Juan M Guillermety
(74) *Attorney, Agent, or Firm* — Canon U.S.A., Inc. IP Division

(57) ABSTRACT

Provided is an acquisition unit configured to, in a case where a predetermined function is newly added as a function related to a communication apparatus and of which execution is instructed with a voice input to a voice control device, after an input from the user who permits the execution of the at least one function is performed. The acquisition unit acquires information that is based on a predetermined voice input that indicates whether to permit the execution of the predetermined function and that has been received by voice from the user by the voice control device.

15 Claims, 14 Drawing Sheets

FIG.11

| USER ID (1101) | LAST USAGE DATE (1102) | UPDATE CODE (1103) |
|---|---|---|
| U001 | 2019/2/1 | 1 |
| U002 |  | 2 |
| U003 | 2018/10/23 | 2 |
| U004 | 2019/1/28 | 2 |

FIG.13

| MESSAGE ID | GUIDE MESSAGE |
|---|---|
| R1 | APPLICATION HAS BEEN UPDATED. TO USE NEW FUNCTION, MAKE SETTING BY PRINTER ADMINISTRATOR. |
| R2 | PRINTER MAINTENANCE BY VOICE INSTRUCTION HAS BECOME AVAILABLE. TO USE NEW FUNCTION, GIVE EXECUTION PERMISSION OF NEW FUNCTION. |

WELCOME TO PRINT SERVICE.

1401

COLORING BOOK AND NUMBER PLACE (SUDOKU) CAN BE PRINTED USING PRINTER, AND PRINTER STATE AND INK REMAINING AMOUNT CAN BE CHECKED.

1402

FOLLOWING CONTENT CAN BE PRINTED.
COLORING BOOK, NUMBER PLACE (SUDOKU), WRITING PAPER, STAFF NOTATION, AND CHECKLIST

PRINTING WRITING PAPER.

1405

TO PERFORM PRINTING ON WRITING PAPER MORE EASILY, ISSUE FOLLOWING INSTRUCTION TO SMART SPEAKER.
"ACTIVATE PRINTER AND PRINT WRITING PAPER"

COMMUNICATION SYSTEM, SERVER SYSTEM, AND COMMUNICATION APPARATUS, RELATING TO PERMISSION TO EXECUTE A NEWLY ADDED FUNCTION

BACKGROUND

Field

The present disclosure relates to a communication system, a server system, and a communication apparatus.

Description of the Related Art

A communication system including an information processing apparatus such as a server is already known. If an instruction to execute a function related to a communication apparatus, such as a printer, is input by voice to a voice control device, such as a smart speaker, the information processing apparatus executes the function corresponding to the execution instruction (Japanese Patent Application Laid-Open No. 2019-046102).

To execute a function related to the communication apparatus, the information processing apparatus needs to preliminarily acquire a permission for execution of the function from a user. Even in a state in which permissions for the executions of some functions have already been acquired, a new function of which an execution permission has not been acquired from the user yet is sometimes added as the function related to the communication apparatus. As the use of the above-described communication system expands, it is being demanded to appropriately execute processing in a case where a new function for which an execution permission has not been acquired from the user yet is added as the function related to a communication apparatus.

SUMMARY

The present disclosure is directed to appropriately executing processing in a case where a new function for which an execution permission has not been acquired from a user yet is added as a function related to a communication apparatus.

According to an aspect of the present disclosure, a communication system includes a communication apparatus, and a server system. The server system includes a receiving unit configured to receive information that is based on an input from a user who permits execution of at least one function related to the communication apparatus, the execution of the at least one function instructed with a voice input to a voice control device. The at least one function includes a function of causing the communication apparatus to execute printing, and an acquisition unit configured to, in a case where a predetermined function is newly added as a function related to the communication apparatus and of which execution is instructed with a voice input to the voice control device, after an input from the user who permits the execution of the at least one function is performed, acquire information that is based on a predetermined voice input that indicates whether to permit the execution of the predetermined function and that has been received by voice from the user by the voice control device. The communication apparatus includes an execution unit configured to, in a case where the information that is based on the predetermined voice input indicates that the execution of the predetermined function is permitted, execute processing that is based on the predetermined function.

Further features will become apparent from the following description of exemplary embodiments with reference to the attached drawings.

BRIEF DESCRIPTION OF THE DRAWINGS

FIG. 11 is a diagram illustrating an example of a table used for guide message necessity determination.

FIG. 13 is a diagram illustrating an example of a table indicating descriptions of each guide message.

FIGS. 14A and 14B are diagrams each illustrating an example of a notification screen.

DESCRIPTION OF THE EMBODIMENTS

Hereinafter, an exemplary embodiment will be described in detail with reference to the attached drawings. The following exemplary embodiment is not intended to limit the present disclosure set forth in the appended claims, and not all the combinations of features described in the present exemplary embodiment are always essential to the solution of the present disclosure.

<System Configuration>

Figure 1:
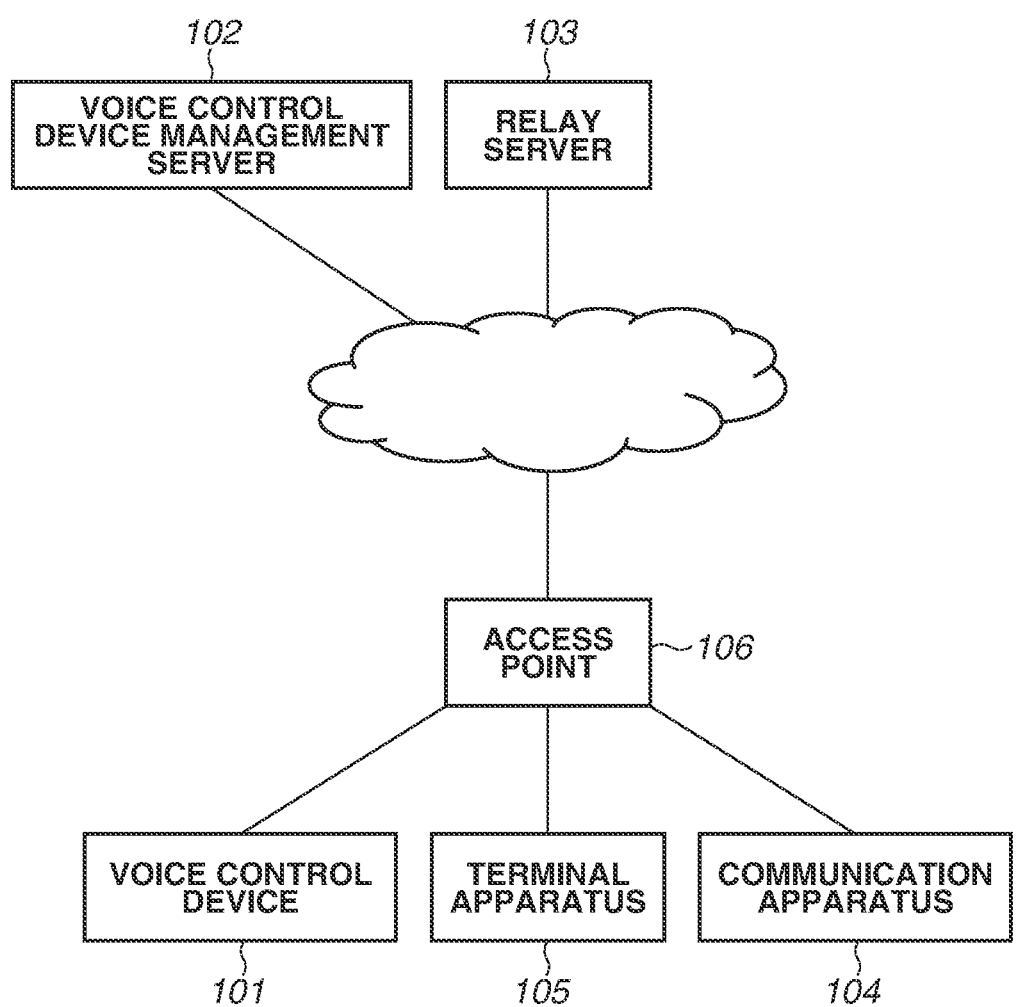
FIG. 1 is a diagram illustrating an example of a configuration of a communication system.

A first exemplary embodiment will be described below. FIG. 1 illustrates an example of a configuration of a communication system according to the present exemplary embodiment. The communication system according to the present exemplary embodiment includes, for example, a voice control device 101, a voice control device management server (hereinafter, management server) 102, a relay server 103, a communication apparatus 104, a terminal apparatus 105, and an access point (AP) 106. The voice control device 101 is a smart speaker, for example. The terminal apparatus 105 is an optional terminal apparatus, such as a smartphone, a personal computer (PC), a tablet terminal, a mobile phone, and a personal digital assistant (PDA). Hereinafter, the terminal apparatus 105 will be described as a smartphone. The communication apparatus 104 is a communication apparatus according to the present exemplary embodiment, and is a printer that forms (prints) an image onto a recording medium by applying recording material, such as ink, onto the recording medium. The communication apparatus 104 may be a multifunction peripheral including a plurality of functions, such as a copy function, a FAX function, and a print function. In the present exemplary embodiment, the communication apparatus 104 will be described as an apparatus that performs printing using an inkjet method, but a printing method is not limited to the inkjet method. For example, the communication apparatus 104 may be an apparatus that performs printing using an electrophotographic method or a dye sublimation method. In the present exemplary embodiment, the communication apparatus 104 is exemplified as a communication apparatus, but the communication apparatus is not limited to this. For example, the communication apparatus may be an apparatus that can provide a service other than a print service, such as a copying apparatus, a facsimile apparatus, a smartphone, a mobile phone, a tablet terminal, a PDA, a digital camera, a music reproduction device, a storage, a projector, or a PC. The AP 106 is a wireless local area network (LAN) router, for example. Apparatuses connecting to the AP 106 can use the Internet via the AP 106. In the present exemplary embodiment, the voice control device 101, the communication apparatus 104, and the terminal apparatus 105 wirelessly connects to the AP 106 in compliance with a wireless communication method for a wireless LAN complying with the IEEE 802.11 standard series.

The voice control device 101 and the terminal apparatus 105 can communicate with the management server 102 via the AP 106 and the Internet. The communication apparatus 104 can communicate with the relay server 103 via the AP 106 and the Internet. The voice control device 101 and the terminal apparatus 105 can connect (communicate) with each other via the AP 106. In the system diagram illustrated in FIG. 1, the voice control device 101, the communication apparatus 104, and the terminal apparatus 105 can use the Internet by connecting to the same AP, but the configuration is not limited to this configuration. For example, the voice control device 101, the communication apparatus 104, and the terminal apparatus 105 may be accessible to the Internet by connecting to different APs. The voice control device 101, the communication apparatus 104, and the terminal apparatus 105 may be accessible to the Internet by connecting to a cellular communication network, such as a Long Term Evolution (LTE) or fourth generation (4G)e, without connecting to an AP.

In the present exemplary embodiment, the management server 102 is a server provided by a vendor of the voice control device 101, and manages processing that is executed by a voice instruction issued to the voice control device 101. The relay server 103 is a server provided by a vendor of the communication apparatus 104, and manages processing that is executed by an instruction issued to the communication apparatus 104 via the Internet. In the present exemplary embodiment, the relay server 103 provides a function that uses the communication apparatus 104 that can execute printing (i.e., a print service). The functions included in the print service are not limited to the function of causing the communication apparatus 104 to execute printing. The print service can include other functions such as a function of causing the communication apparatus 104 to execute scan processing, a function of checking a state of the communication apparatus 104, and a function of causing the communication apparatus 104 to execute maintenance.

In the present exemplary embodiment, one server (information processing apparatus, such as a PC) functions as the management server 102, and one server (information processing apparatus, such as a PC) functions as the relay server 103, but the configuration is not limited to this configuration. A plurality of servers may function as the management server 102 or the relay server 103 by operating in cooperation. In other words, the server system of each of the management server 102 and the relay server 103 may include one or a plurality of servers.

Figure 2:
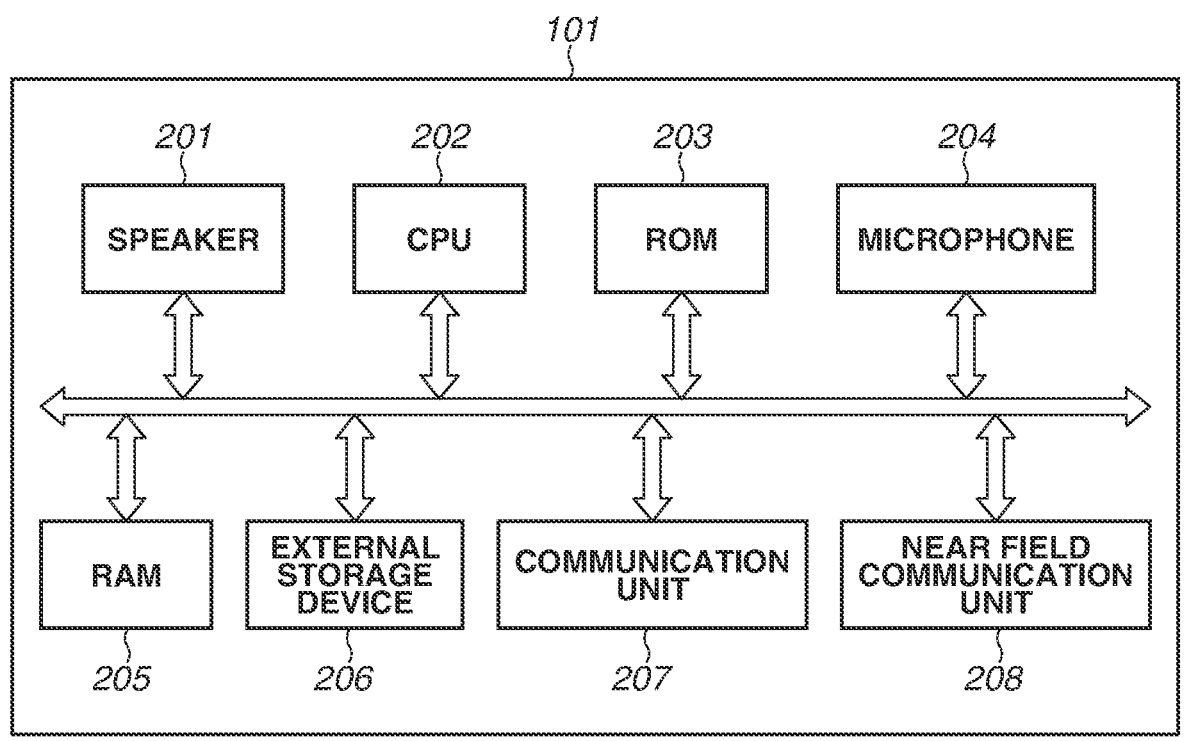
FIG. 2 is a block diagram schematically illustrating an example of a hardware configuration of a voice control device.
Figure 3:
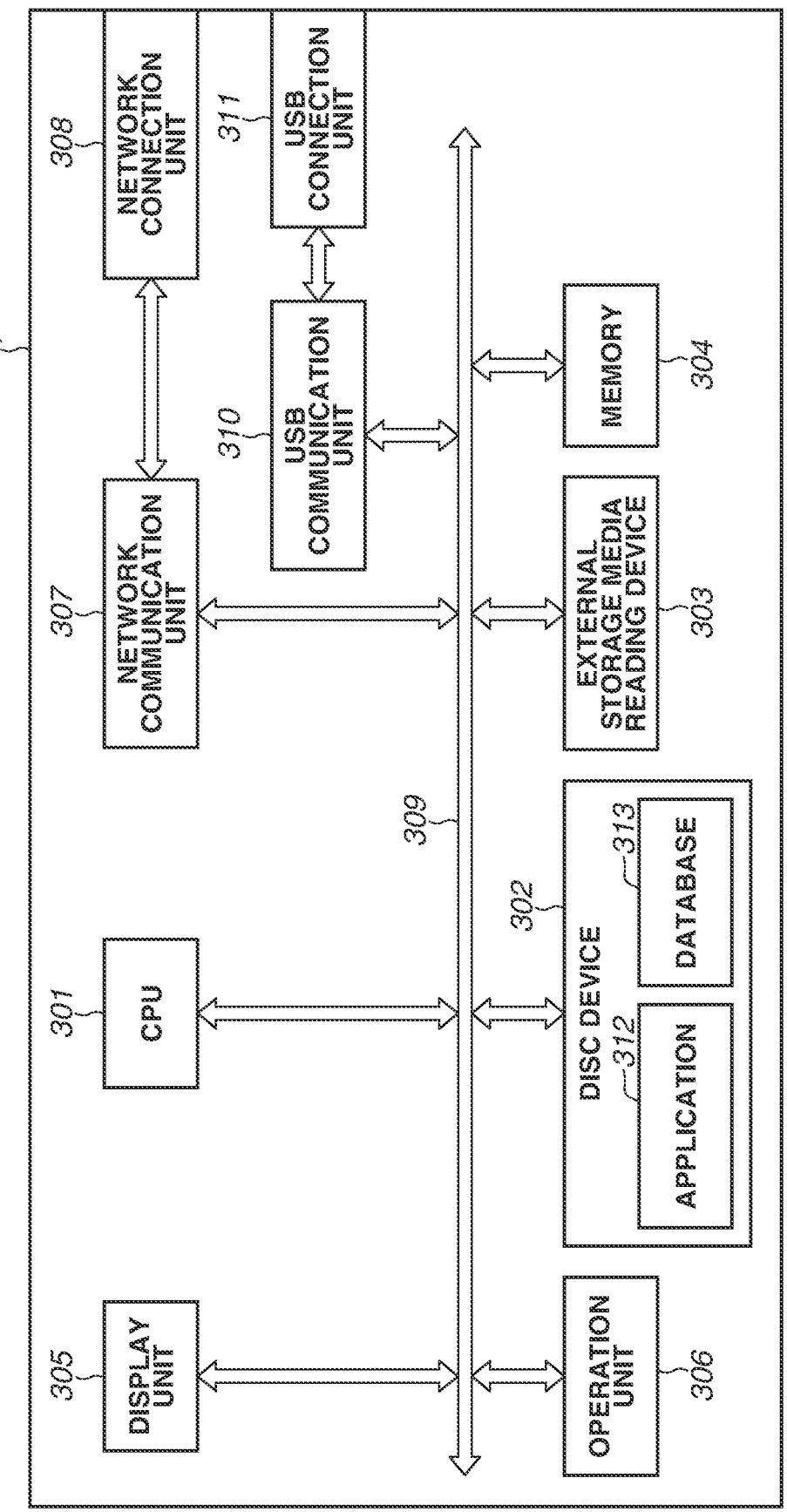
FIG. 3 is a block diagram schematically illustrating an example of a hardware configuration of each server.
Figure 4:
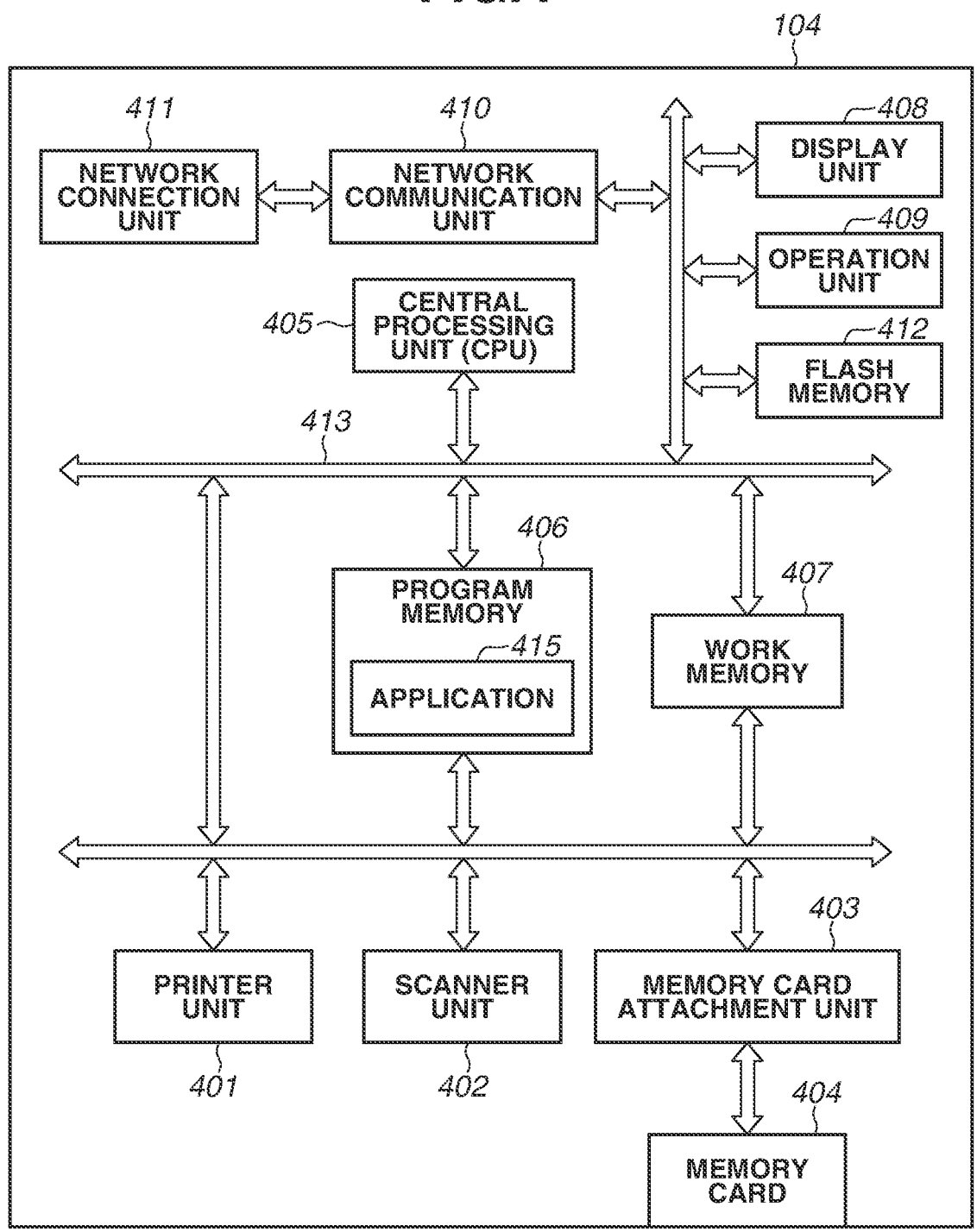
FIG. 4 is a block diagram schematically illustrating an example of a hardware configuration of a communication apparatus.

FIG. 2 is a block diagram schematically illustrating an example of a hardware configuration of the voice control device 101. The voice control device 101 includes a speaker 201, a central processing unit (CPU) 202, a read-only memory (ROM) 203, a microphone 204, a random access memory (RAM) 205, an external storage device 206, a communication unit 207, and a near field communication unit 208. The blocks illustrated in FIGS. 2 to 4 are connected with each other via an internal bus, for example. These components are merely examples, and each apparatus may include a hardware component other than the hardware components illustrated in the drawings. A plurality of blocks in FIGS. 2 to 4 may be combined into one block, or one block may be divided into two or more blocks. In other words, each apparatus can have any configuration as long as the following processing can be executed.

The speaker 201 emits voice through the following processing. The CPU 202 is a system control unit and is a processor that controls the entire voice control device 101. The ROM 203 stores fixed data, such as a control program to be executed by the CPU 202, a data table, and an embedded operating system (OS) program. In the present exemplary embodiment, each control program stored in the ROM 203 is used for performing software execution control, such as scheduling, task switch, and interrupt processing, under the control of an embedded OS stored in the ROM 203. The microphone 204 receives voice around the voice control device 101. For example, the microphone 204 receives voice emitted by the user. The RAM 205 includes a static RAM (SRAM) that requires a backup power source. Because data is held in the RAM 205 by a primary battery for data backup (not illustrated), the RAM 205 can store data such as program control variables without volatilizing the data. The RAM 205 is also provided with a memory area for storing setting information and management data of the voice control device 101. The RAM 205 is also used as the main memory and a work memory of CPU 202. The external storage device 206 stores application software.

The communication unit 207 includes a circuit and an antenna for performing communication in compliance with a predetermined wireless communication method. For example, the communication unit 207 can wirelessly connect to an access point. The communication unit 207 sometimes operates as an access point that is temporarily used. The wireless communication to be used in the present exemplary embodiment may have the capability to operate in compliance with a wireless communication method (Wi-Fi) of a wireless LAN complying with the IEEE 802.11 standard series or may have the capability to operate in compliance with another wireless communication method.

The near field communication unit 208 executes near field communication with another apparatus present within a fixed near field range from the voice control device 101. The near field communication unit 208 performs communication in compliance with a wireless communication method different from that of the communication unit 207. In the present exemplary embodiment, the near field communication unit 208 operates in compliance with a Bluetooth® standard.

Figure 5:
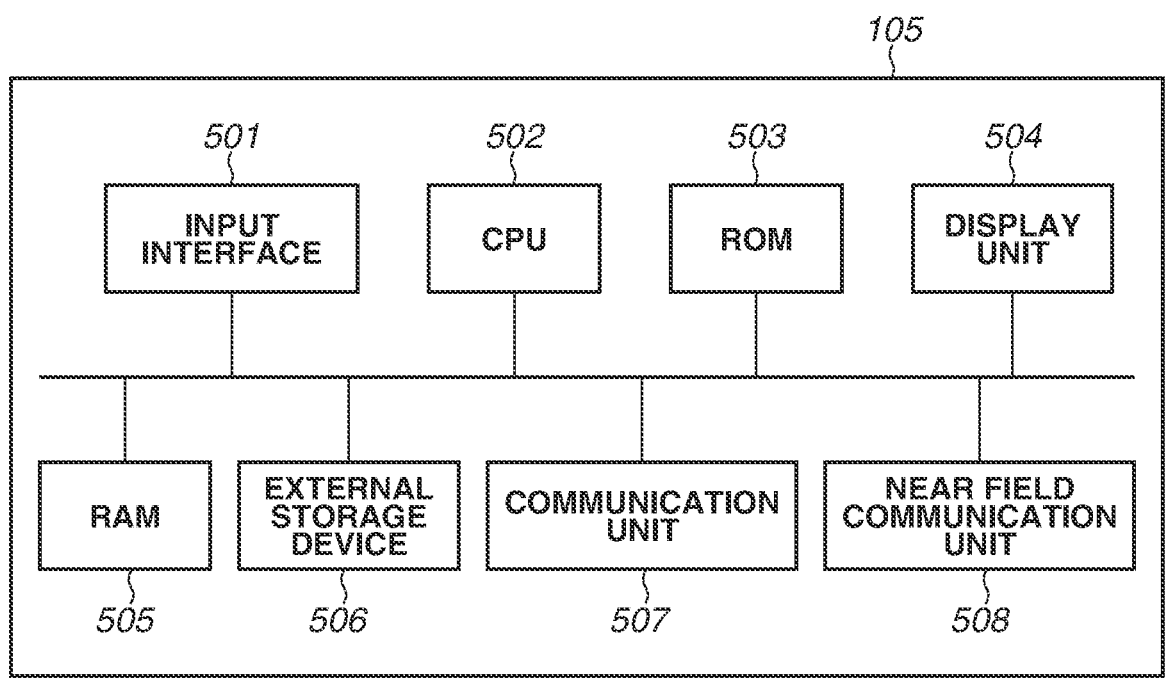
FIG. 5 is a block diagram schematically illustrating an example of a hardware configuration of a terminal apparatus.

FIG. 5 is a block diagram schematically illustrating an example of a hardware configuration of the terminal apparatus 105. The terminal apparatus 105 includes, as an example, an input interface 501, a CPU 502, a ROM 503, a display unit 504, a RAM 505, an external storage device 506, a communication unit 507, and a near field communication unit 508. These blocks are connected with each other via an internal bus.

The CPU 502 is a system control unit and controls the entire terminal apparatus 105. As in RAM 505, for example, the RAM 505 includes a dynamic RAM (DRAM) requiring a backup power source. The RAM 505 is also used as a main memory and a work memory of the CPU 502. The ROM 503 stores fixed data, such as a control program that is executed by the CPU 502, a data table, and an OS program. In the present exemplary embodiment, an application program for the voice control device 101 (hereinafter, voice control application) is installed on the terminal apparatus 105 and stored in the ROM 503.

The display unit 504 includes a light-emitting diode (LED) or a liquid crystal display (LCD) and displays screens based on various types of data. By including a touch display, the display unit 504 may have a function of receiving various inputs from the user. In other words, the display unit 504 may be an interface for receiving a data input or an operation instruction from the user, or an operation panel including a physical keyboard, buttons, and a touch panel. The communication unit 507 has a function similar to the above-described communication unit 207 and can wirelessly connect with another apparatus via the AP 106. The near field communication unit 508 is an apparatus that can perform near field communication with the near field communication unit 208 using the same wireless communication method as in the near field communication unit 208.

FIG. 3 is a block diagram schematically illustrating an example of a hardware configuration of the management server 102 and the relay server 103. In the present exemplary embodiment, one server functions as the management server 102, and one server functions as the relay server 103. However, a server system equivalent to the management server 102 or the relay server 103 can be formed by a plurality of servers operating in cooperation.

A CPU 301 is a processor for controlling the following components. A disc device 302 stores various files in addition to an application program 312 to be read by the CPU 301, a database 313, and an OS. An external storage media reading device 303 is used for reading information such as a file stored in an external storage medium, such as a secure digital (SD) card. A memory 304 includes RAM and the like. The CPU 301 temporarily stores or buffers data into the memory 304 as necessary. A display unit 305 includes an LED or an LCD and displays screens based on various types of data. An operation unit 306 includes a keyboard and a mouse for the user to perform various input operations. A network communication unit 307 is connected with a network, such as the Internet, via a network connection unit 308 and performs various types of communication. The network communication unit 307 performs communication via a wired LAN or a wireless LAN. If the network communication unit 307 supports a wired LAN, the network connection unit 308 is a connector for connecting a cable of the wired LAN. If the network communication unit 307 supports a wireless LAN, the network connection unit 308 is an antenna. The network connection unit 308 can support both a wired LAN and a wireless LAN. A universal serial bus (USB) communication unit 310 is connected with various peripheral devices via a USB connection unit 311 and performs various types of communication in compliance with a USB standard. The above-described components are connected with each other via a bus 309. The following processing of the management server 102 and the relay server 103 is implemented by the CPU 301 reading a program necessary to process and execute the program.

FIG. 4 is a block diagram schematically illustrating an example of a hardware configuration of the communication apparatus 104.

In the communication apparatus 104, a print function is implemented by a printer unit 401, a scanner function is implemented by a scanner unit 402, and a storage function is implemented by a memory card attachment unit 403 and a memory card 404.

The printer unit 401 executes printing based on image data received from the outside, or image data stored in the memory card 404. The printer unit 401 also manages ink information, such as an ink remaining amount, and sheet information, such as a sheet remaining amount.

The scanner unit 402 optically reads a document set on a platen (not illustrated), converts the read document into electronic data, and transmits image data further converted into a designated file format, to an external apparatus via a network, or stores the converted image data into a storage region, (not illustrated) such as a hard disc drive (HDD). A copy function is implemented by transferring to the printer unit 401, image data generated by reading a document placed on the platen, using the scanner unit 402, and the printer unit 401 printing an image based on the image data, onto a print sheet.

The memory card 404 attached to the memory card attachment unit 403 stores various types of file data. The file data is sometimes read from an external apparatus via a network and edited. The file data can also be stored in the memory card 404 from an external apparatus.

The communication apparatus 104 further includes a CPU 405, a program memory 406, a work memory 407, a display unit 408, an operation unit 409, a network communication unit 410, a network connection unit 411, and a flash memory 412. The CPU 405 is a processor for controlling the components in the communication apparatus 104. The program memory 406 includes a ROM and stores various program codes and an application 415 for communicating with the relay server 103. In addition, the application 415 accesses the printer unit 401 and acquires ink information and sheet information. The work memory 407 includes a RAM and temporarily stores or buffers image data when each service is executed. The display unit 408 includes an LED or an LCD and displays screens that are based on various types of data. The operation unit 409 includes switches for the user to perform various input operations. The network communication unit 410 is connected with a network, such as the Internet, via a network connection unit 411 and performs various types of communication. The network communication unit 410 performs communication via a wired LAN or a wireless LAN. If the network communication unit 410 supports a wired LAN, the network connection unit 411 is a connector for connecting a cable of the wired LAN. If the network communication unit 410 supports a wireless LAN, the network connection unit 411 is an antenna. The network connection unit 411 may support both a wired LAN and a wireless LAN. In the present exemplary embodiment, the network communication unit 410 supports a wireless LAN and connects with the AP 106 in compliance with a wireless communication method of a wireless LAN complying with the IEEE 802.11 standard series.

The flash memory 412 is a nonvolatile memory for storing image data received by the network communication unit 410. The above-described components are connected with each other via a bus 413. The following processing of the communication apparatus 104 is implemented by the CPU 405 reading a program necessary for processing, and executing the program.

<Print Processing that Uses Voice Control Device 101>

In the communication system illustrated in FIG. 1, print processing using the voice control device 101 is executed. First of all, to execute print processing that uses the voice control device 101, it is necessary to execute registration processing of the management server 102 to manage apparatuses in an association. The registration processing will be described with reference to the sequence diagram in FIG. 6. Processing executed by each apparatus in this sequence is implemented by a CPU of a corresponding apparatus executing a program stored in a ROM of the corresponding apparatus. A program to be executed by the terminal apparatus 105 is a voice control application.

Initially, registration processing for the management server 102 to manage apparatuses in association will be described.

Before the registration processing is executed, the user logs into a user account (hereinafter, first account) of the voice control device 101, managed by the management server 102, using a voice control application of the terminal apparatus 105. Thus, the management server 102 manages the terminal apparatus 105 and the first account in association. The management server 102 accordingly recognizes information regarding a voice control application of the terminal apparatus 105 associated with the first account. The terminal apparatus 105 recognizes information regarding the first account (account name, ID, password, etc.).

In step S601, the voice control device 101 receives a predetermined operation from the user, and shifts to a mode for executing first registration processing. Specifically, the voice control device 101 activates an access point included in the voice control device 101.

Next, in step S602, the terminal apparatus 105 receives an execution instruction of registration processing from the user through an input performed on a screen displayed by the voice control application.

Next, in step S603, the terminal apparatus 105 connects to an access point included in the voice control device 101, via Wi-Fi.

Next, in step S604, the terminal apparatus 105 identifies an external access point to be connected to the voice control device 101. Specifically, the terminal apparatus 105 searches for a nearby external access point and displays a list of discovered external access points. The terminal apparatus 105 identifies an external access point selected by the user from among the list. A method of identifying the external access point is not limited to this configuration. For example, the terminal apparatus 105 may receive a list of external access points discovered by the search executed by the voice control device 101, from the voice control device 101 via Wi-Fi connection, and identify an external access point selected by the user from among the list. For example, the terminal apparatus 105 may identify an external access point to which the terminal apparatus 105 has connected when an instruction to execute registration processing has been received from the user.

Next, in step S605, the terminal apparatus 105 transmits information regarding the external access point identified in step S604 and information regarding the above-described first account, to the voice control device 101 via Wi-Fi connection. After transmitting the information in step S605, the terminal apparatus 105 may disconnect the Wi-Fi connection with the voice control device 101, and establish Wi-Fi connection with the external access point identified in step S604.

In the above description, the voice control device 101 receives information necessary for the first registration processing, via Wi-Fi, but the configuration is not limited to this configuration. For example, in a mode for executing the first registration processing, the voice control device 101 may enable a Bluetooth® function and receive information necessary for the first registration processing via Bluetooth® connection with the terminal apparatus 105.

Next, in step S606, the voice control device 101 deactivates the access point included in the voice control device 101, and disconnects Wi-Fi connection with the terminal apparatus 105. The voice control device 101 connects with the external access point via Wi-Fi based on the information regarding the external access point that has been received from the terminal apparatus 105. If the establishment of Wi-Fi connection with the external access point has succeeded, the voice control device 101 may provide a voice notification indicating the success.

Next, in step S607, the voice control device 101 accesses the management server 102 via the external access point, and transmits information regarding the first account that has been received from the terminal apparatus 105, and identification information regarding the voice control device 101, to the management server 102.

Next, in step S608, based on the received information, the management server 102 manages the voice control device 101 and the first account in association. The management server 102 has already managed the terminal apparatus 105 and the first account in association. Thus, by step S608, the voice control device 101, the terminal apparatus 105, and the first account are associated.

Next, in step S609, the terminal apparatus 105 performs registration of a service (skill) to be utilized using the voice control device 101. In the present exemplary embodiment, a print service corresponding to the communication apparatus 104 is registered as a service that uses the voice control device 101. Thus, the terminal apparatus 105 transmits, to the management server 102, information indicating that a print service supported by the communication apparatus 104 has been selected by the user. In the registration of skills, the first account and a user account (hereinafter, second account) managed by the relay server 103 in association with the print service are associated. Thus, the following processing will be referred to as account link processing.

Next, in step S610, based on the received information, the management server 102 manages the print service supported by the communication apparatus 104, and the first account in association. In other words, the print service supported by the communication apparatus 104 is registered.

Next, in step S611, the management server 102 transmits a uniform resource locator (URL) for logging into the print service to the terminal apparatus 105.

Next, in step S612, the terminal apparatus 105 accesses the relay server 103 using the URL received in step S611 and requests login screen information from the relay server 103. The login screen information is information for displaying a login screen for logging into the second account.

Next, in step S613, the relay server 103 transmits the login screen information to the terminal apparatus 105 as a response to the request issued in step S612.

Figure 9:
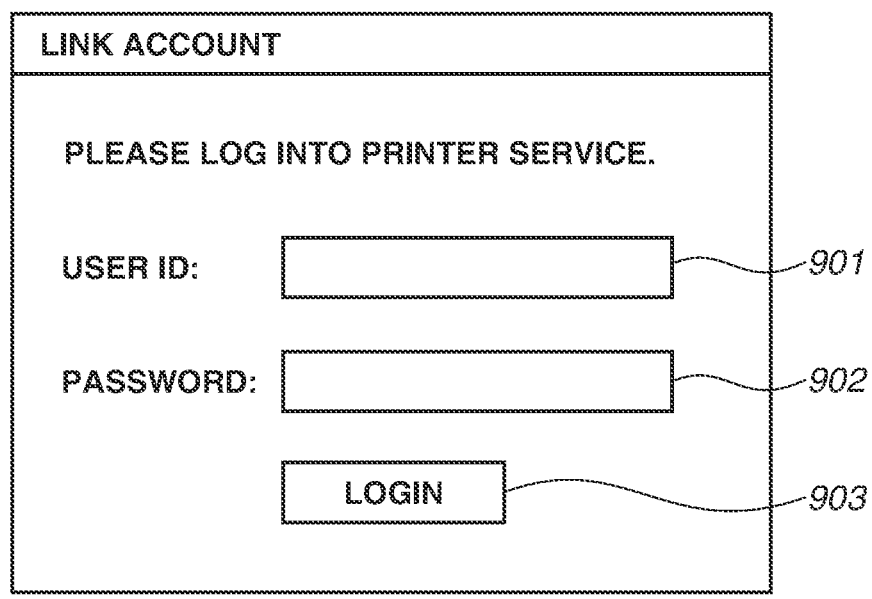
FIG. 9 is a diagram illustrating an example of a login screen.

Next, in step S614, the terminal apparatus 105 displays a login screen. Since login to the second account has been executed using, for example, a PC that controls the communication apparatus 104, the relay server 103 preliminarily manages the second account and the communication apparatus 104 in association. FIG. 9 illustrates an example of the login screen to be displayed at this time. A region 901 is a region for entering an ID of the second account, and a region 902 is a region for entering a password for logging into the second account. A region 903 is a region for issuing an instruction for logging in to the second account.

Next, in step S615, the terminal apparatus 105 receives an operation on region 903. The terminal apparatus 105 then transmits to the relay server 103, login information entered into the regions 901 and 902, information regarding the first account, and information regarding the management server 102.

Next, in step S616, the relay server 103 determines whether the received login information is correct. If the received login information is correct and login to the second account has succeeded, the relay server 103 transmits permission screen information to the terminal apparatus 105. The permission screen information is information regarding a screen for receiving an input indicating whether to permit the management server 102 to execute a function related to the communication apparatus 104 (i.e., a function executable using the relay server 103). If the received login information is wrong and login to the second account has failed the relay server 103 transmits information indicating that the login has failed, to the terminal apparatus 105. If terminal apparatus 105 receives the information indicating that the login has failed, the terminal apparatus 105 notifies the user that the login has failed and the entered login information is wrong, and then receives entry of login information again.

Figure 10A:
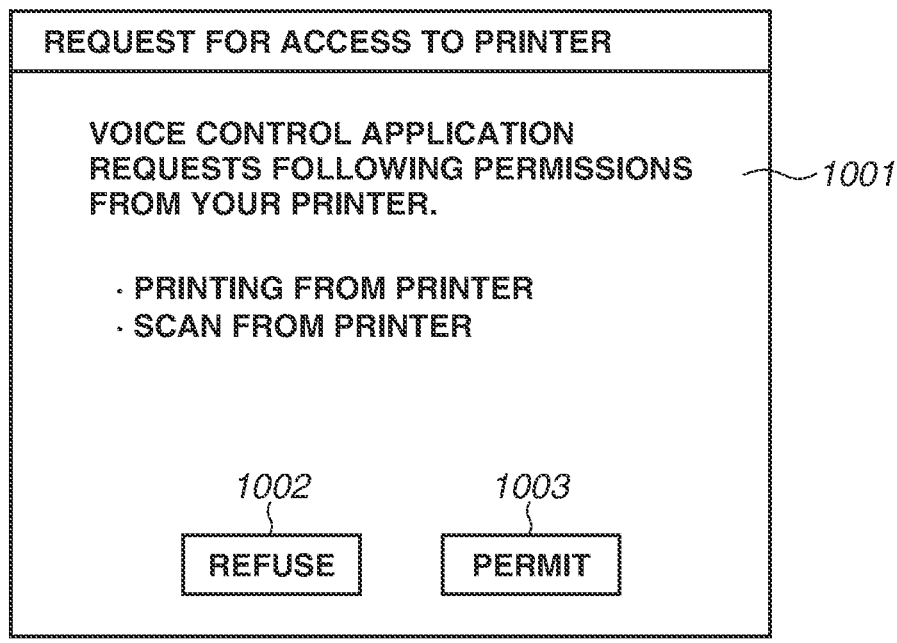
FIGS. 10A and 10B are diagrams each illustrating an example of a permission screen.

Next, in step S617, the terminal apparatus 105 displays a permission screen (input screen). FIG. 10A illustrates an example of the permission screen to be displayed at this time. A region 1001 is a region indicating functions targeted for permission check. The functions targeted for permission check include, for example, a function of causing the communication apparatus 104 to execute printing and a function of causing the communication apparatus 104 to execute scan processing. If the execution of these functions is permitted, it becomes possible for the management server 102 to execute the permitted functions based on a user instruction issued to the voice control device 101. A region 1002 is a button to be pressed if the user does not permit the management server 102 to execute functions related to the communication apparatus 104. In addition, a region 1003 is a button to be pressed if the user permits the management server 102 to execute functions related to the communication apparatus 104. Hereinafter, a case where the region 1003 is pressed will be described.

Next, in step S618, the terminal apparatus 105 receives an operation performed on the region 1003. The terminal apparatus 105 then transmits, to the relay server 103, information indicating that the execution of a function related to the communication apparatus 104 has been permitted.

Next, in step S619, the relay server 103 manages information indicating that the user corresponding to the first account has permitted the execution of the functions indicated by the permission screen, in association with the first account. In other cases, for example, the region 1002 has been pressed, and information indicating that the execution of a function related to the communication apparatus 104 has not been permitted is transmitted to the relay server 103. In such cases, the relay server 103 manages information indicating that the user corresponding to the first account has not permitted the execution of the functions indicated by the permission screen, in association with the first account. This enables the relay server 103 to manage an account and a function of which execution is permitted by the user corresponding to the account. After that, based on the information regarding the management server 102 that has been received in step S615, the relay server 103 accesses the management server 102. The relay server 103 transmits, to the management server 102, an access token for permitting access by the first account, and information regarding the second account.

Next, in step S620, based on the received information, the management server 102 manages the first account and the second account in an association. The management server 102 recognizes that the user has permitted the execution of the function targeted for permission check. Thereafter, the execution of the permitted functions is enabled if the user requests the permitted functions by voice via the voice control device 101.

Next, in step S621, the management server 102 notifies the terminal apparatus 105 that the association between the first account and the second account has been completed.

Next, in step S622, based on the notification issued in step S621, the terminal apparatus 105 displays a notification screen for notifying that the association between the first account and the second account has been completed. If the execution of functions related to the communication apparatus 104 has not been permitted by an operation on the region 1002 being received, the terminal apparatus 105 displays a screen for notifying that the association between the first account and the second account has failed.

This enables the management server 102 to manage each apparatus and each account in association, and recognize which information is to be transmitted to which apparatus in notification processing in the present exemplary embodiment.

Processing executed by the terminal apparatus 105 in the above description may be executed via a web browser included in the terminal apparatus 105, for example, instead of a voice control application.

Processing of executing a function related to the communication apparatus 104 by a voice instruction issued to the voice control device 101 will be described with reference to a sequence diagram illustrated in FIG. 7. Processing to be executed by each apparatus in this sequence is implemented by a CPU of a corresponding apparatus executing a program stored in a ROM of the corresponding apparatus. Processing to be executed by each apparatus in this sequence is executed in a state in which the registration processing in conjunction with FIG. 6 has been completed.

Initially, the user utters a first wake word corresponding to the voice control device 101, near the voice control device 101. The voice control device 101 accordingly shifts to a mode for receiving a voice instruction from the user. Specific examples of the first wake word include a name of a voice control device. After that, the user utters a second wake word as an instruction to execute a function related to the communication apparatus 104. Specific examples of the second wake word include a phrase, for example, "activate a printer".

Thus, in step S701, by receiving the user's voice using the microphone 204, the voice control device 101 receives an instruction (second wake word) to execute a function related to the communication apparatus 104.

Next, in step S702, the voice control device 101 transmits voice data based on the voice received in step S701 to the management server 102 via the Internet. In transmitting the voice data, the voice control device 101 may transmit the voice of the user that has been received using the microphone 204, as voice data without change, or may convert the voice of the user into text data and transmit the text data as voice data.

Next, in step S703, the management server 102 analyzes the received the voice data. Specifically, the management server 102 analyzes the voice data corresponding to the second wake word and identifies the first account associated with the voice control device 101, the relay server 103, and the second account.

Figure 6:
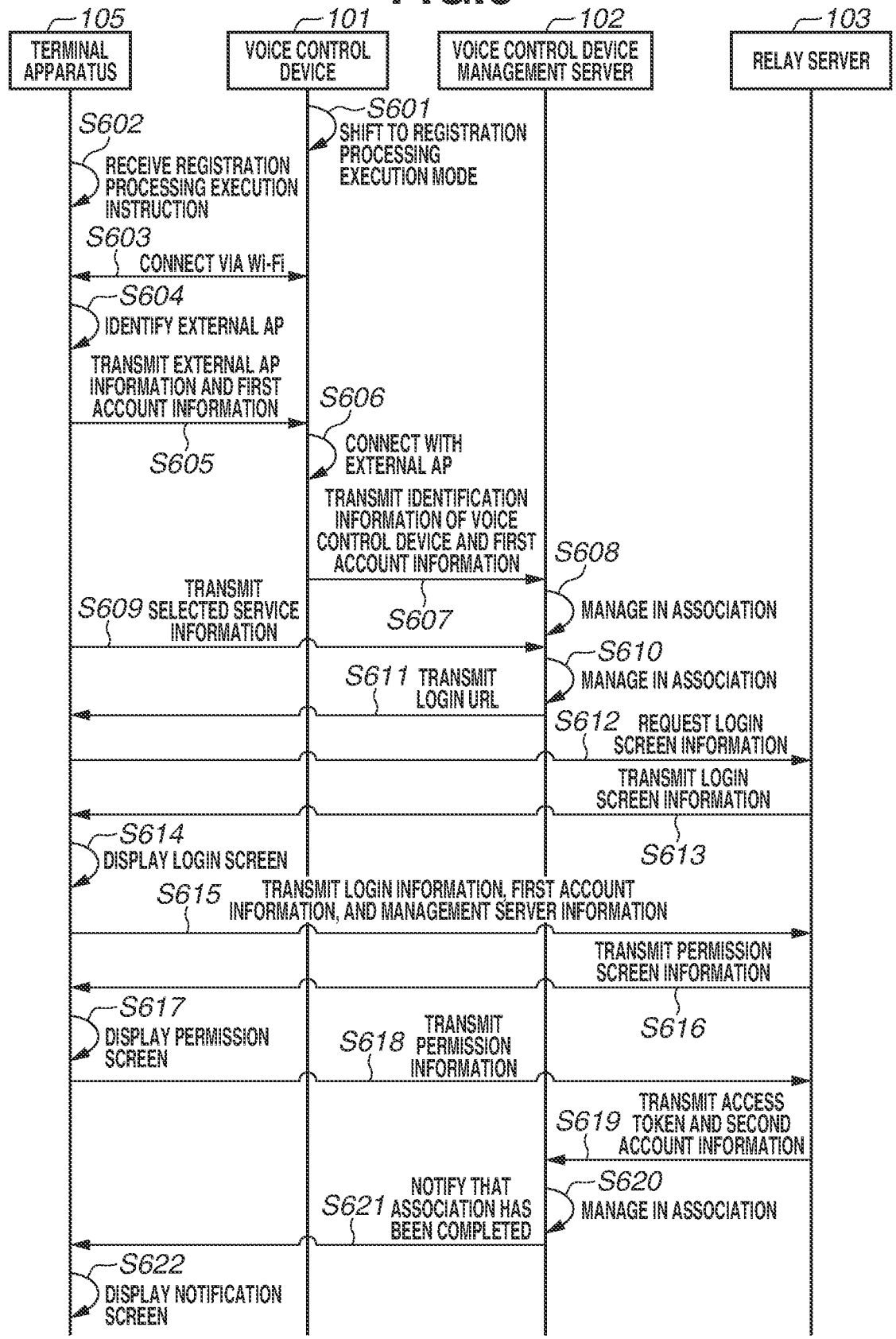
FIG. 6 is a sequence diagram illustrating an example of registration processing.
Figure 7:
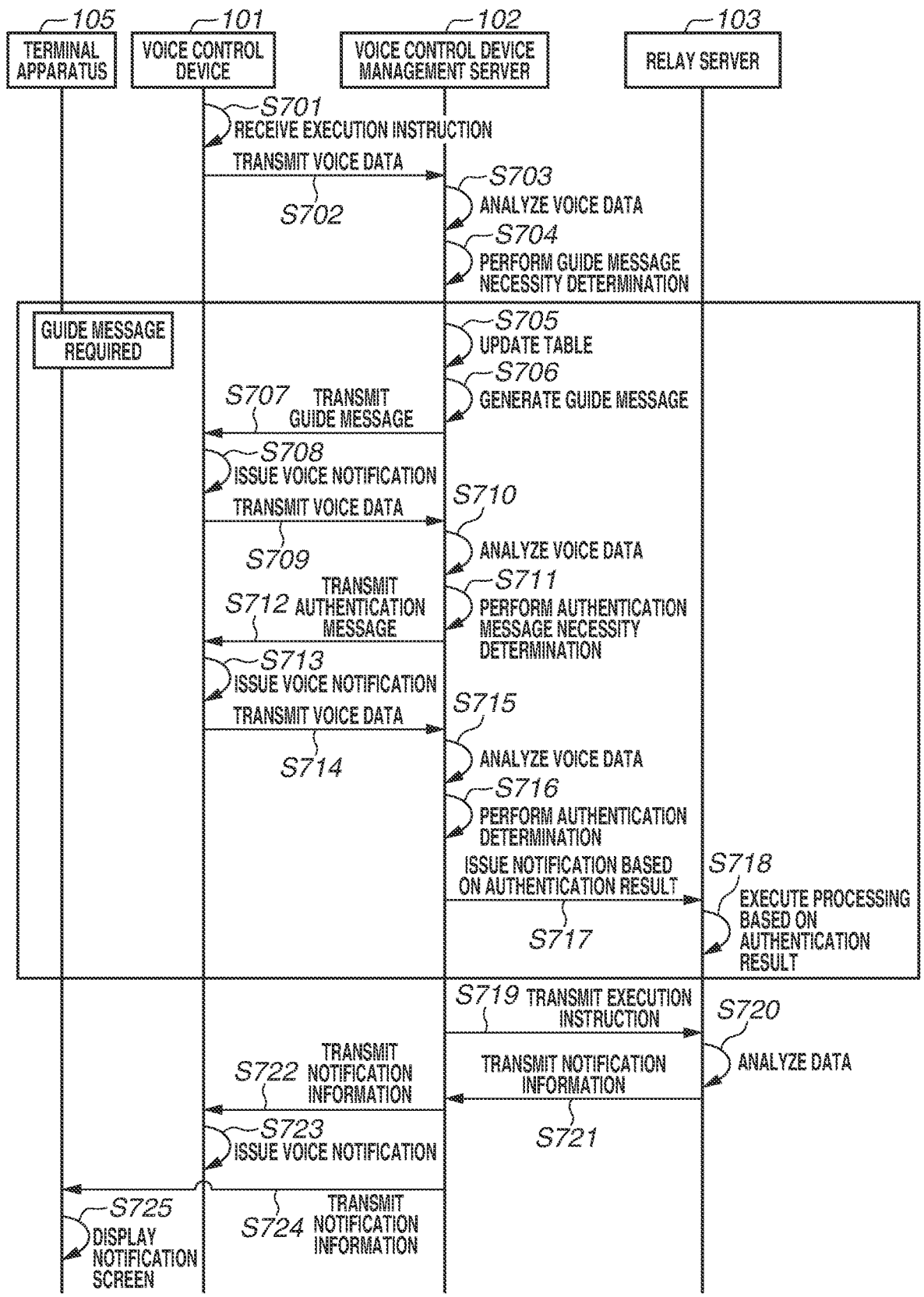
FIG. 7 is a sequence diagram illustrating an example of a processing for executing a function related to a communication apparatus by a voice instruction.

In the processing illustrated in FIG. 6, the management server 102 acquires execution permission for a function related to the communication apparatus 104 from the user. Nevertheless, by the updates of the communication apparatus 104, the relay server 103, and the management server 102, for example, a new function is sometimes added as a function related to the communication apparatus 104. In the present exemplary embodiment, an application program of the management server 102 is assumed to be updated. If the update is performed, to execute the added new function via the management server 102, the management server 102 needs to acquire an execution permission for this function from the user. Examples of the newly-added function include a function of acquiring information regarding the communication apparatus 104, and issuing a voice notification indicating the acquired information, using the voice control device 101, and a function of causing the communication apparatus 104 to execute maintenance processing. Examples of the newly-added function further include a function of causing the communication apparatus 104 to execute copy processing, and a function of causing the communication apparatus 104 to switch a power state of the communication apparatus 104. In a case where the update is performed, it is desirable to issue a notification related to the update. Specifically, for example, if functions to be executed using the communication apparatus 104 include a function for which an execution permission has not been acquired yet from the user corresponding to the first account, due to the execution of update, it is desirable to issue a notification for prompting the user to give an execution permission.

Thus, in step S704, the management server 102 determines whether to issue a notification related to the update. In the present exemplary embodiment, a notification related to the update is issued by transmitting a guide message related to the update. The determination will be referred to as guide message necessity determination.

A specific determination method in the guide message necessity determination will be described. First of all, the management server 102 requests a determination result indicating whether to issue a notification related to an update from the relay server 103. The relay server 103 holds a table, as illustrated in FIG. 11. In the table, a user ID 1101 is an ID indicating an account that uses a service provided by the relay server 103. A last usage date 1102 is a date (or a date and time) on which each account has lastly executed a function related to the communication apparatus 104 via a service provided by the relay server 103. An update code 1103 is a flag indicating whether each account has executed a function related to the communication apparatus 104 after a last update day via a service provided by the relay server 103. The last update day indicates the date and time on which a new function is last added as a function related to the communication apparatus 104 by the update executed most recently. The management server 102 holds information indicating the last update day, in the database 313. For example, the relay server 103 compares the date and time on which a function related to the communication apparatus 104 has been executed, and the last update day, and appropriately updates the update code 1103. If the update code 1103 indicates "1", it is indicated that a corresponding account has executed a function related to the communication apparatus 104 after the last update day. In other words, it is indicated that no update has been performed after the date and time on which the corresponding account has lastly (most recently) executed a function related to the communication apparatus 104. If the update code 1103 indicates "2", it is indicated that a corresponding account has not executed a function related to the communication apparatus 104 after the last update day. In other words, it is indicated that an update has been performed after the date and time on which the corresponding account has lastly (most recently) executed a function related to the communication apparatus 104. If the corresponding account has not executed a function that uses the communication apparatus 104, after the last update day, an execution permission for a newly-added function has not been acquired from the corresponding account. Thus, in the present exemplary embodiment, the relay server 103 determines whether to issue a notification related to the update, based on a value of the update code 1103. Specifically, if the update code 1103 indicates "1" and the first account has executed a function related to the communication apparatus 104 after the last update day, the relay server 103 determines that the determination result in step S704 indicates NO. If the update code 1103 indicates "2" and the first account has not executed a function related to the communication apparatus 104 after the last update day, the relay server 103 determines to issue a notification related to the update. The details of the determination are not limited to this configuration. For example, the relay server 103 may include a flag directly indicating whether execution permissions for all the functions that are executed using the communication apparatus 104, including a function added on the last update day, have been acquired from a corresponding account. Then, if execution permissions for all the functions have been acquired from the corresponding account, the relay server 103 may determine not to issue a notification related to the update. If execution permissions for all the functions have not been acquired from the corresponding account, the relay server 103 may determine to issue a notification related to the update. The relay server 103 notifies the management server 102 of a result obtained by such determination, and the management server 102 determines whether to issue a notification related to the update, based on the received determination result. The above description has been provided of a configuration in which the relay server 103 makes a determination that is based on a table as illustrated in FIG. 11, and notifies the management server 102 of the determination result, but the configuration is not limited to this configuration. For example, the management server 102 may hold a table as illustrated in FIG. 11, and the above-described determination may be made on the management server 102 without making an inquiry to the relay server 103.

If a determination result in step S704 indicates NO, the processing proceeds to step S719 without executing the processing in steps S705 to S718. If the determination result in step S704 indicates YES, in step S705, the management server 102 updates information regarding the table illustrated in FIG. 11. Specifically, the management server 102 updates the update code 1103 corresponding to the first account, from "2" to "1".

Next, in step S706, the management server 102 generates a guide message. The details of a method of generating a guide message will be described below. In the present exemplary embodiment, a notification including a guide message is issued only by a voice notification provided by the voice control device 101, but the configuration is not limited to this configuration. A notification including a guide message may be issued by a screen notification provided by the terminal apparatus 105. In this case, the management server 102 individually generates a guide message for the voice control device 101, and a guide message for the terminal apparatus 105. If the guide message for the terminal apparatus 105 is transmitted to the terminal apparatus 105 in association with the first account, the terminal apparatus 105 displays a notification screen including the descriptions of the guide message. Alternatively, for example, only a screen notification may be provided by the terminal apparatus 105 with a voice notification not being provided by the voice control device 101.

The details of a method of generating a guide message in step S706 will be described. First of all, the CPU 301 determines whether a user who has input an execution instruction by voice to the voice control device 101 in step S701 is a user having an authority to administrate the communication apparatus 104. The management server 102 preliminarily recognizes a feature of voice emitted by the user having the authority to administrate the communication apparatus 104. The CPU 301 then makes the determination by comparing the preliminarily recognized voice and the voice input in step S701. The determination may be made by another method. For example, the determination may be made by preliminarily associating a user ID 1101 with authority information indicating whether an administrator authority is given, and referring to the authority information associated with the user ID 1101, which is the account corresponding to the user who has input the voice.

A description will be provided of processing which is performed in a case where it is not determined that the user who has input an execution instruction by voice to the voice control device 101 in step S701 is a user having the authority to administrate the communication apparatus 104. The CPU 301 generates a guide message R1 for notifying the user corresponding to the first account that an execution permission for a function added by an update is to be provided by the user having the authority to administrate the communication apparatus 104. The management server 102 holds a table indicating the description of each guide message as illustrated in FIG. 13, in the database 313. In the table, a message ID 1301 indicates an ID corresponding to each guide message. A guide message 1302 indicates the description of a notification to be notified with each guide message. The CPU 301 generates the guide message R1 with reference to the table illustrated in FIG. 13. The guide message R1 may further include a message for prompting the user corresponding to the first account to cause the user having the authority to administrate the communication apparatus 104, to perform account link processing. After that, CPU 301 advances the processing to step S707.

A description will be provided of processing which is performed in a case where it is determined that the user who has input an execution instruction by voice to the voice control device 101 in step S701 is the user having the authority to administrate the communication apparatus 104. The CPU 301 generates a guide message R2 for notifying the user corresponding to the first account that a function related to the communication apparatus 104 has been newly added, or for prompting the user corresponding to the first account to issue an execution permission for the newly-added function. The processing is also executed with reference to the table illustrated in FIG. 13. The guide message R2 may include information indicating the details of the newly-added function. In other words, the guide message R2 may vary based on details of the newly-added function. In addition, the guide message R2 may further include a message for prompting the user corresponding to the first account to perform account link processing. After that, the CPU 301 ends the present process, and the processing proceeds to step S707.

Next, in step S707, the management server 102 transmits a guide message for the voice control device 101 that has been generated in step S706 to the voice control device 101.

Next, in step S708, the voice control device 101 notifies by voice of the guide message received in step S707, using the speaker 201. By the notification including the description of the guide message, the user is prompted to issue an execution permission for a function added by update. If a message included in the notification issued at the time is the guide message R2, by the notification including the description of the guide message, the user is asked whether to perform an input indicating whether to permit the management server 102 to execute the function added by update. Thus, in step S709, by receiving voice of the user using the microphone 204, the voice control device 101 receives an input indicating whether to permit the management server 102 to execute the function added by an update. If a message included in the notification issued in step S708 is the guide message R1, because an input indicating whether to permit the management server 102 to execute the function added by an update is not received at the timing, the processing proceeds, not to step S709, but to step S719.

In step S710, the management server 102 analyzes the received voice data. Then in step S711, based on an analysis result, the management server 102 determines whether to perform an input indicating whether to permit the management server 102 to execute the function added by update. If the determination result indicates YES, in step S712, the management server 102 transmits an authentication message. The authentication message is a message for asking the user whether to permit the management server 102 to execute the function added by the update. If the determination result indicates NO, the management server 102 advances the processing to step S719 without transmitting an authentication message.

In step S713, the voice control device 101 notifies by voice of the description of the authentication message received in step S712, using the speaker 201. By the notification including the description of the authentication message, the user is asked whether to permit the management server 102 to execute the function added by the update. Thus, in step S714, by receiving voice of the user using the microphone 204, the voice control device 101 receives an input indicating whether to permit the management server 102 to execute the function added by the update.

In step S715, the management server 102 analyzes the received voice data. Then in step S716, based on an analysis result, the management server 102 determines whether an input for permitting the management server 102 to execute the function added by the update has been performed. In step S717, the management server 102 issues a notification based on the determination result (authentication result) in step S716.

In step S718, based on the received notification, the relay server 103 executes processing based on the determination result (authentication result) in step S716. Specifically, for example, if the determination result in step S716 indicates YES, the relay server 103 manages information indicating that the user corresponding to the first account has permitted the execution of the function added by the update, in association with the first account With this configuration, if the user requests a permitted function thereafter, the permitted function can be executed. At this time, the relay server 103 may notify the management server 102 that information for issuing a voice notification of a message indicating that a permission has been received is to be transmitted to the voice control device 101. On the other hand, if the determination result in step S716 indicates NO, the relay server 103 manages information indicating that the user corresponding to the first account has not permitted the execution of the function indicated on the permission screen, in association with the first account. In this case, control may be performed in such a manner that processing of receiving an input indicating whether to permit the management server 102 to execute the function added by update is not executed for a certain period of time even if a wake word is input to the voice control device 101. Alternatively, for example, the number of times for which the process of receiving an input indicating whether to permit the management server 102 to execute the function added by the update is executable may be preset. If the execution of the function added by the update is not permitted by the user, the preset number of times may be decremented. Alternatively, by referring to the table illustrated in FIG. 11, the process of receiving the input indicating whether to permit the management server 102 to execute the function added by update becomes executable each time a predetermined number of days has passed after the last update day. Alternatively, for example, an input for requesting the voice control device 101 not to execute any more process of receiving the input indicating whether to permit the management server 102 to execute the function added by the update may be executable by the user. With this configuration, if such an input is performed, control is performed in such a manner that the process of receiving the input indicating whether to permit the management server 102 to execute the function added by the update is not executed any more. If the execution of the function added by the update is not permitted, the relay server 103 executes control in such a manner that the function added by the update is not executed. Specifically, the control is performed to prevent the function added by the update, from being included in a list of functions executable by a voice input when the voice control device 101 notifies the user of the list by voice (in step S721 to be described below), for example. In addition, for example, the control is performed to prevent the function added by the update, from being executed, even in a case where an execution instruction is issued by the user by a voice input although the function added by the update is not permitted by the user. If an execution instruction is issued by a voice input although the function added by the update is not permitted by the user, control may be performed in such a manner that a voice notification indicating that the execution of the function designated in the execution instruction is not permitted is issued to the user by the voice control device 101.

If the determination result in step S704 indicates NO or if the operation in step S718 is completed, the operation in step S719 is executed. In step S719, the management server 102 notifies the relay server 103 that an execution instruction to execute a function related to the communication apparatus 104 has been received. Information transmitted at this time includes information indicating the second account.

Next, in step S720, the relay server 103 identifies that the execution of the print service is requested. The relay server 103 identifies the second account based on the information received in step S719, and identifies whether the function related to the communication apparatus 104 is to be executed.

Next, in step S721, the relay server 103 transmits to the management server 102 notification information for notifying a list of functions related to the communication apparatus 104. In the present exemplary embodiment, because both a notification by the voice control device 101 and a notification by the terminal apparatus 105 are issued, the relay server 103 individually transmits notification information for the voice control device 101 and notification information for the terminal apparatus 105. In the present exemplary embodiment, the description of a message to be notified by the voice control device 101 is determined based on the notification information for the voice control device 101. In other words, the relay server 103 controls the description of the message to be notified by voice issued by the voice control device 101. Similarly, the description of a message or a graphic to be notified via a screen issued by the terminal apparatus 105 is determined based on the notification information for the terminal apparatus 105. In other words, the relay server 103 controls the description of a message or a graphic that is to be notified via the screen issued by the terminal apparatus 105. For example, the function to be notified is a function of which execution is permitted by the user. In the present exemplary embodiment, even if there is a function that has been added by an update and has not been permitted yet, the management server 102 can execute already-permitted functions. Thus, even if there is a function that has been added by an update and has not been permitted yet, already-permitted functions are included in the notification.

Next, in step S722, based on the received notification information, the management server 102 transmits, to the voice control device 101, voice notification information for issuing a voice notification indicating a list of functions related to the communication apparatus 104.

Next, in step S723, based on the received voice notification information, the voice control device 101 issues a voice notification indicating a list of functions to be executed using the communication apparatus 104, using the speaker 201. Examples of the functions related to the communication apparatus 104 are as described above. At this time, only a part of functions that are executed using the communication apparatus 104 may be notified, instead of a list of the functions that use the communication apparatus 104. In addition, details of the functions that use the communication apparatus 104 may be notified. For example, if a function that uses the communication apparatus 104 is the function of causing the communication apparatus 104 to execute printing, the content to be printed (news, math problem, puzzle, etc.) by using the function may be notified.

Next, in step S724, based on the received notification information, the management server 102 transmits screen notification information for providing a notification, by screen display, indicating a function related to the communication apparatus 104, to the terminal apparatus 105 associated with the first account. The operation in step S724 may be executed before the operation in step S722.

Next, in step S725, based on the received screen notification information, the terminal apparatus 105 displays a notification screen for notifying the function related to the communication apparatus 104, on the display unit 504. Specifically, for example, the terminal apparatus 105 displays a notification screen 1400 as illustrated in FIG. 14A. In the present exemplary embodiment, the terminal apparatus 105 notifies the user of more detailed description via the notification screen than the description to be notified by voice by the voice control device 101. The notification screen 1400 includes a region 1401 for notifying the function related to the communication apparatus 104 and a region 1402 for notifying the type of content printable with the print function. The description to be notified by the voice notification issued in step S723 and the description to be notified by the screen notification issued in step S725 may be different. Specifically, for example, while a message included in region 1401 is included in the voice notification issued in step S723, a message included in region 1402 may not be included in the voice notification issued in step S723. An item to be displayed on the notification screen is not limited to a message for notifying information regarding the communication apparatus 104, such as the messages displayed in the regions 1401 and 1402. The notification screen may include a graphic for notifying information regarding the communication apparatus 104.

This configuration enables the user to recognize a function related to the communication apparatus 104, and issue an execution instruction to execute the function related to the communication apparatus 104.

With such a configuration, it is possible to generate an appropriate guide message suitable for the details of an update or the state of the communication apparatus 104. It is also possible to receive an input indicating whether to permit the management server 102 to execute a function added by an update from the user by voice, and easily execute the reception of the input.

Figure 10B:
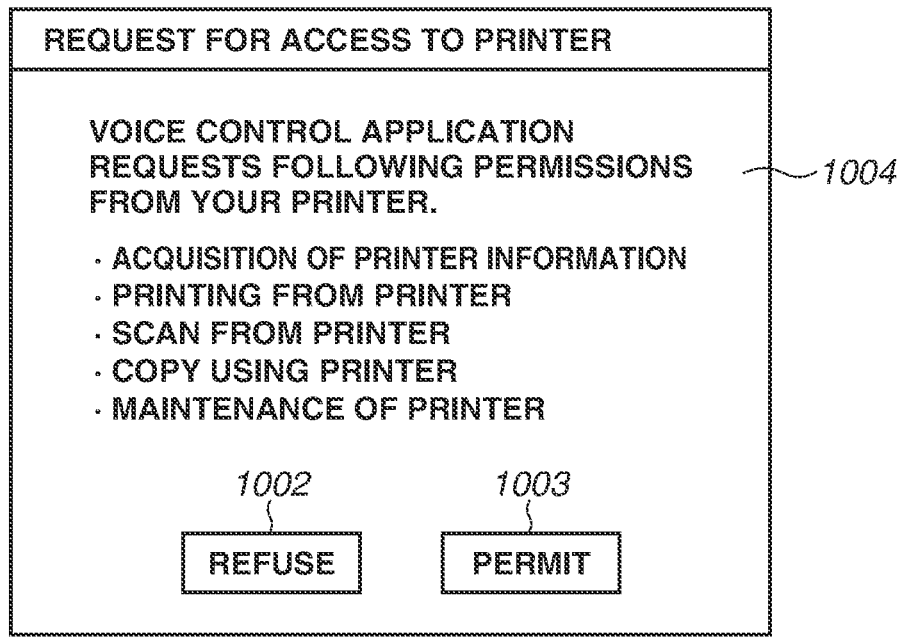

An execution permission for the function added by the update can also be given by account link processing in step S609 and the subsequent steps being executed again. Thus, a guide message may be a message for prompting the user to execute account link processing, for example. FIG. 10B illustrates an example of a permission screen that is displayed in a case where the functions targeted for permission check are added by the update. In addition to the functions that had been displayed before the update, the functions added by the update are displayed in a region 1004. If an operation on the region 1003 is received on the permission screen, the execution of all the currently-enabled functions including the functions added by update is permitted.

If the execution of the functions added by the update is permitted, a voice notification for recommending that the user input an instruction to execute the function to the voice control device 101 by voice may be issued by the voice control device 101. The management server 102 and the relay server 103 may accordingly control the voice control device 101 to issue the voice notification.

The above description has been provided of a configuration in which a notification regarding an authentication message is issued when a notification of a guide message is issued, and an execution permission for the function is received by voice, but an execution permission for the function may be received by voice at another timing. For example, in account link processing, an execution permission for the function may be received by voice instead of receiving via a screen, or an execution permission for the function may be made receivable both via a screen and voice.

Figure 12:
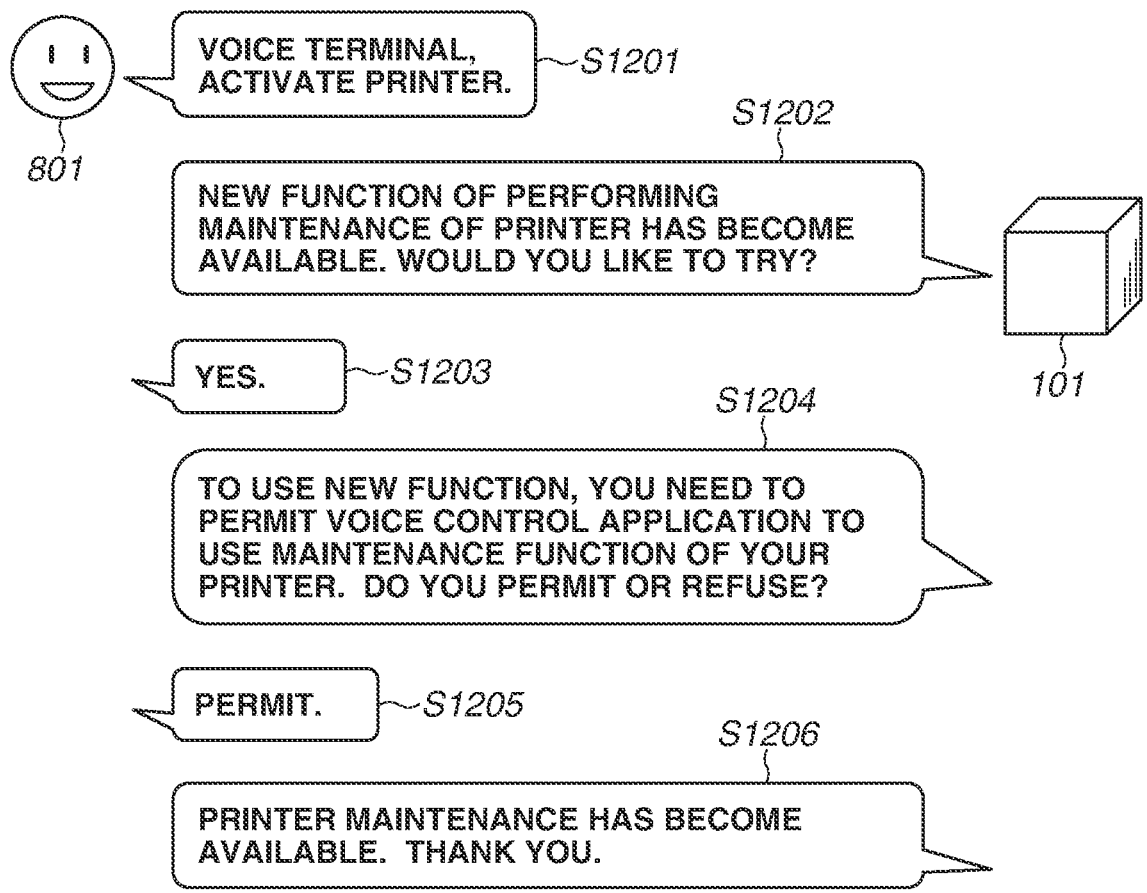
FIG. 12 is a diagram illustrating an example of exchange of voice between a user and voice control device.

The exchange of voice between the user and the voice control device 101 that is implemented by the above-described processing when the function added by the update is permitted will be described with reference to FIG. 12.

First of all, in step S1201, the user utters a first wake word corresponding to the voice control device 101, near the voice control device 101. Next, in step S1202, the voice control device 101 issues a notification including a guide message and notifies the user that a function related to the communication apparatus 104 has been newly added. Next, in step S1203, the user inputs by voice that an input indicating whether to permit the management server 102 to execute the function added by the update is to be performed. Next, in step S1204, the voice control device 101 asks the user by voice whether to permit the management server 102 to execute the function added by the update. Next, in step S1205, the user performs a voice input for permitting the management server 102 to execute the function added by the update. Next, in step S1206, the voice control device 101 notifies the user that an execution permission for the function added by the update has been received. In this manner, in the present exemplary embodiment, the user can input an execution permission for a function only by making a voice exchange.

Figure 8:
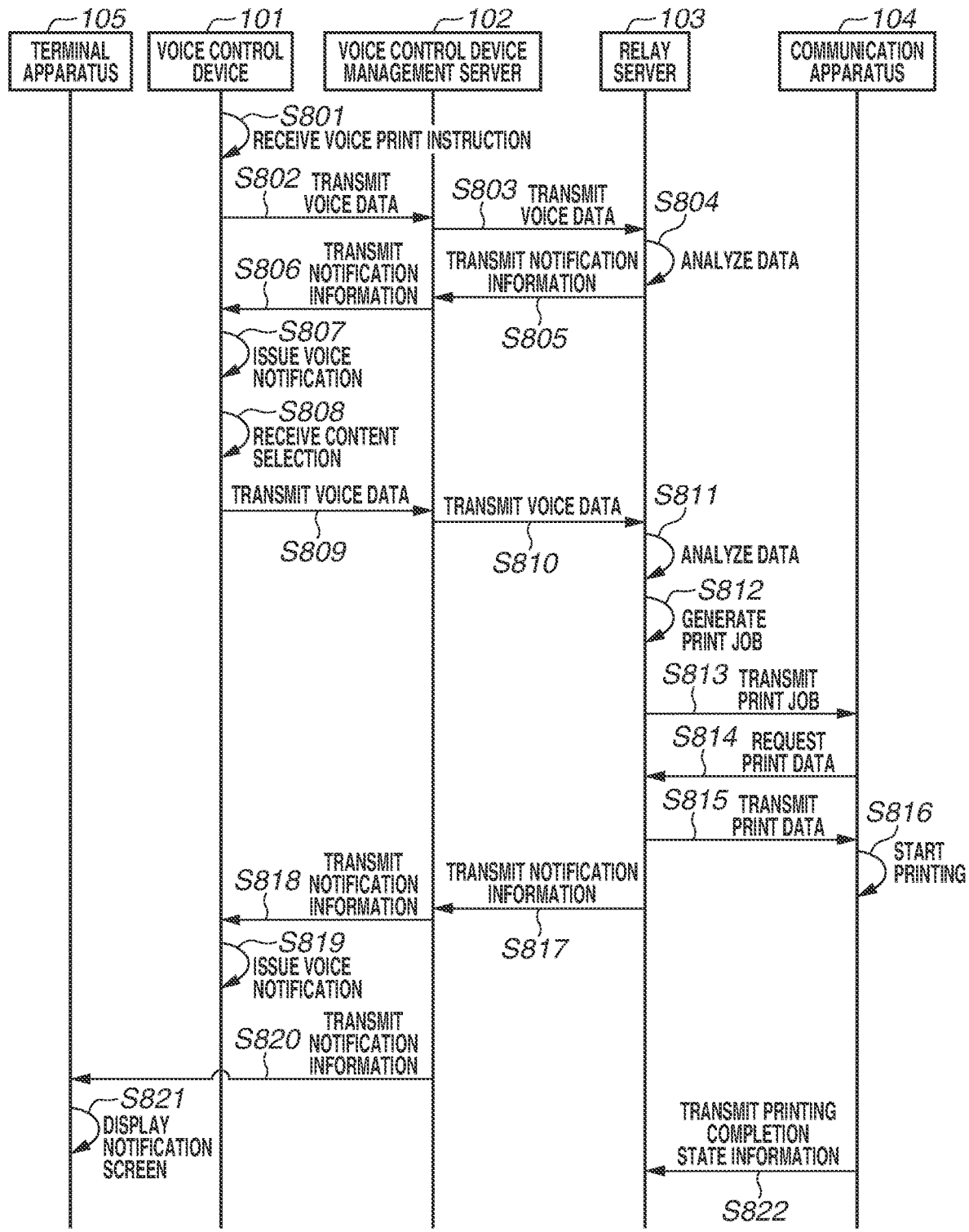
FIG. 8 is a sequence diagram illustrating an example of a print processing that uses a voice control device.

Next, print processing that uses the voice control device 101 will be described. FIG. 8 illustrates a sequence diagram of the print processing that uses the voice control device 101. The operations to be executed by each apparatus in this sequence are implemented by the CPU of the corresponding apparatus executing a program stored in a ROM of the corresponding apparatus. The operations to be executed by each apparatus in this sequence are executed in a state in which the processing described in conjunction with FIG. 7 has been completed. In the present exemplary embodiment, even if a new function is added by the update to functions that uses the communication apparatus 104, association between the first account and the second account is not cancelled. Thus, even in a state in which the determination result in step S704 of the processing in FIG. 7 indicates YES, and an execution permission for a newly-added function has not been obtained, for example, the communication system can execute already-permitted functions. In other words, if a permission for the print function has already been obtained from the user, the communication system can execute the following processing even in a state in which an execution permission for a newly-added function has not been obtained.

First of all, to use the print function among the functions related to the communication apparatus 104, the user utters a third wake word corresponding to the print function, as a print instruction.

Thus, in step S801, in response to receiving the voice of the user using the microphone 204, the voice control device 101 receives a print instruction (third wake word).

Next, in step S802, the voice control device 101 transmits voice data based on the voice received in step S801 to the management server 102 via the Internet.

Next in step S803, the management server 102 transmits information that is based on the received voice data, to the relay server 103.

Next, in step S804, the relay server 103 analyzes the information received in step S803 and determines that the execution of the print function is requested.

Next, in step S805, the relay server 103 transmits notification information for the voice control device 101 for notifying by voice the type of content printable with the print function, to the management server 102. In the present exemplary embodiment, the type of content printable with the print function is notified only by a voice notification issued by the voice control device 101, but the type may be notified by a screen notification provided by the terminal apparatus 105. In other words, the relay server 103 may further transmit notification information for the terminal apparatus 105 to notify by screen display the type of content printable with the print function.

Next, in step S806, based on the received notification information, the management server 102 transmits voice notification information for notifying by voice the type of content printable with the print function, to the voice control device 101.

Next, in step S807, based on the received voice notification information, the voice control device 101 notifies the type of content printable with the print function, by voice using the speaker 201.

Thus, the user recognizes the type of content printable with the print function and selects content to be printed by the print function, by uttering the name of the content. At this time, the user may utter print settings in the printing of the content (the number of copies, color setting of printing, etc.).

Thus, in step S808, by receiving the user's voice using the microphone 204, the voice control device 101 receives the selection of content to be printed with the print function, and the print settings.

Next, in step S809, the voice control device 101 transmits voice data based on the voice received in step S808 to the management server 102 via the Internet.

Next, in step S810, the management server 102 transmits information based on the received voice data to the relay server 103.

Next, in step S811, the relay server 103 analyzes the information received in step S810 and identifies the content to be printed with the print function.

Next, in step S812, the relay server 103 generates print data in a binary format for printing print target content and a print job for causing the communication apparatus 104 associated with the second account to execute printing of the print target content. The generated print data is stored in a predetermined storage region of the relay server 103. The generated print job includes information (URL, etc.) for acquiring print data stored in the predetermined storage region of the relay server 103.

Next, in step S813, the relay server 103 transmits the generated print job to the communication apparatus 104 associated with the second account, via the Internet.

Next, in step S814, based on the received print job, the communication apparatus 104 transmits a request for acquiring the print data stored in the predetermined storage region of the relay server 103 to the relay server 103.

Next, in step S815, the relay server 103 transmits the print data generated in step S812 to the communication apparatus 104 in response to the request received in step S814. The relay server 103 may transmit a print job including print data in step S813 without separately transmitting a print job and print data to the communication apparatus 104.

Next, in step S816, the communication apparatus 104 starts the execution of printing that is based on the received print job and print data. If an error occurs during the printing, the communication apparatus 104 transmits state information indicating that the communication apparatus 104 is in an error state, to the relay server 103.

Next, in step S817, if printing by the communication apparatus 104 is started, the relay server 103 transmits notification information for notifying that the selected content is being printed by the communication apparatus 104, to the management server 102. In the present exemplary embodiment, both of a notification by the voice control device 101 and a notification by the terminal apparatus 105 are issued, so that the relay server 103 individually transmits notification information for the voice control device 101 and notification information for the terminal apparatus 105.

Next, in step S818, based on the received notification information, the management server 102 transmits voice notification information for notifying by voice that the selected content is being printed by the communication apparatus 104, to the voice control device 101.

Next, in step S819, based on the received voice notification information, the voice control device 101 notifies that the selected content is being printed by the communication apparatus 104, by voice using the speaker 201.

Next, in step S820, based on the received notification information, the management server 102 transmits screen notification information for notifying by screen display that the selected content is being printed by the communication apparatus 104, to the terminal apparatus 105 associated with the first account. The processing in step S820 may be executed before the processing in step S818.

Next, in step S821, based on the received screen notification information, the terminal apparatus 105 displays a notification screen for notifying that the selected content is being printed by the communication apparatus 104, on the display unit 504. Specifically, the terminal apparatus 105 displays a notification screen 1403 as illustrated in FIG. 14B, for example. In the present exemplary embodiment, via the notification screen, the terminal apparatus 105 notifies the user of more detailed description than the description of which the voice control device 101 notifies by voice by. The notification screen 1403 includes a region 1404 for notifying that the selected content is being printed by the communication apparatus 104, and a region 1405 for notifying a wake word for issuing a print instruction that is different from the third wake word. In the present exemplary embodiment, a message included in the region 1404 is also included in the voice notification issued in step S819. Nevertheless, a message included in the region 1405 is not notified with the voice notification issued in step S819, and is notified only with the screen notification issued in step S821.

After that, if printing that is based on the print job has been completed, in step S822, the communication apparatus 104 transmits printing completion state information indicating that printing has been completed, to the relay server 103.

In this manner, the communication apparatus 104 can execute printing, being triggered by a voice print instruction issued to the voice control device 101.

After step S822, based on the printing completion state information, the relay server 103 may transmit notification information for notifying that the printing has been completed, to the voice control device 101 or the terminal apparatus 105.

With such a configuration, the user can control the communication apparatus 104 by a voice instruction to the voice control device 101.

(Other Exemplary Embodiments)

An exemplary embodiment can also be implemented by processing of supplying a program for implementing one or more functions of the above-described exemplary embodiment, to a system or an apparatus via a network or a storage medium, and a computer of the system or the apparatus reading and executing the program. The computer includes one or a plurality of processors or circuits. For reading and executing a computer executable command, the computer can include a network of a plurality of separated computers, or plurality of separated processors or circuits.

Embodiment(s) can also be realized by a computer of a system or apparatus that reads out and executes computer executable instructions (e.g., one or more programs)

recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that this disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-115060, filed Jul. 2, 2020, which is hereby incorporated by reference herein in its entirety.

What is claimed is:

1. A communication system comprising:
a communication apparatus; and
a server system,
wherein the server system includes
at least one first processer, and
at least one first memory coupled to the at least one first processor and having stored thereon instructions, which when executed by the at least one first processor, cause the at least one first processor and the at least one first memory to cooperate to act as:
a receiving unit configured to receive information that is based on an input from a user who permits execution of at least one function related to the communication apparatus, the execution of the at least one function instructed with a voice input to a voice control device,
wherein the at least one function includes a function of causing the communication apparatus to execute printing, and
an acquisition unit configured to, in a case where a predetermined function is newly added as a function related to the communication apparatus and of which execution is instructed with a voice input to the voice control device, after an input from the user who permits the execution of the at least one function is performed, acquire information that is based on a predetermined voice input that indicates whether to permit the execution of the predetermined function and that has been received by voice from the user by the voice control device, wherein the communication apparatus includes
at least one second processer and at least one second memory coupled to the at least one second processor and having stored thereon instructions, which when executed by the at least one second processor, cause the at least one second processor and the at least one second memory to cooperate to act as:
an execution unit configured to, in a case where the information that is based on the predetermined voice input indicates that the execution of the predetermined function is permitted, execute processing that is based on the predetermined function.

2. The communication system according to claim 1,
wherein the server system further includes a processing unit configured to execute processing for causing the voice control device to notify, by voice, a message for receiving the predetermined voice input, and
wherein, after the message is notified by voice by the voice control device, the predetermined voice input is received by voice from the user by the voice control device.

3. The communication system according to claim 2,
wherein the server system further includes
a third execution unit configured to execute association processing for bringing an execution instruction to execute a function into a state in which the execution instruction is transmittable to the communication apparatus by a voice input to the voice control device, based on information regarding a first account corresponding to the voice control device, and information regarding a second account corresponding to the communication apparatus being input on a terminal apparatus, and
a fourth execution unit configured to, in a case where the association processing is executed, execute processing for displaying, on the terminal apparatus, an input screen for receiving an input from a user who permits execution of the at least one function, from the user, and
wherein, in a case where the predetermined function is newly added after the association processing is executed, and an input for permitting the execution of the at least one function is received from the user on the input screen, processing for causing the voice control device to notify the message by voice is executed.

4. The communication system according to claim 2,
wherein processing for causing the voice control device to notify the message by voice is executed based on a voice input to the voice control device being performed, and
wherein, in a case where the user who has performed a voice input to the voice control device does not have an authority to permit the server system to execute the function related to the communication apparatus, the message is a message for acquiring a permission for the server system to execute the predetermined function, from a user having an authority to permit the server system to execute the function related to the communication apparatus.

5. The communication system according to claim 2,
wherein a description of the message varies based on a detail of the predetermined function added as the function related to the communication apparatus.

6. The communication system according to claim 1,
wherein the server system further includes
a third execution unit configured to execute association processing for bringing an execution instruction to execute a function into a state in which the execution instruction is transmittable to the communication apparatus by a voice input to the voice control device, based on information regarding a first account corresponding to the voice control device, and information regarding a second account corresponding to the communication apparatus being input on a terminal apparatus, and a fourth execution unit configured to, in a case where the association processing is executed, execute processing for displaying, on the terminal apparatus, an input screen for receiving an input from a user who permits execution of the at least one function, from the user, and wherein information that is based on an input from a user who permits the execution of the at least one function is received by an input for permitting the execution of the at least one function being received from the user on the input screen.

7. The communication system according to claim 1, wherein the function that is related to the communication apparatus and of which execution is instructed by a voice input to the voice control device, includes at least one of a function of causing the communication apparatus to execute processing executable by the communication apparatus, or a function of acquiring information regarding a state of the communication apparatus.

8. The communication system according to claim 7, wherein the processing executable by the communication apparatus includes at least one of scan processing, copy processing, maintenance processing, or processing of switching a power state of the communication apparatus.

9. The communication system according to claim 1, wherein the predetermined function is added by a predetermined application program in the server system being updated.

10. The communication system according to claim 1, wherein, in a case where information corresponding to the predetermined voice input received by the voice control device indicates that the execution of the predetermined function is permitted, and an execution instruction to execute a function related to the communication apparatus, of which execution has already been permitted by the user is input to the voice control device by voice, processing corresponding to the function related to the communication apparatus is executed in the communication apparatus.

11. The communication system according to claim 1, wherein, in a state in which the predetermined function has been newly added and an execution permission for the predetermined function has not been acquired from the user yet, in a case where an execution instruction to execute a function related to the communication apparatus of which execution has already been permitted by the user is input to the voice control device by voice, processing corresponding to the function related to the communication apparatus of which execution has already been permitted by the user is executed in the communication apparatus.

12. The communication system according to claim 1, further comprising a control unit configured to, in a case where information corresponding to the predetermined voice input received by the voice control device indicates that the execution of the predetermined function is permitted, perform control to cause the voice control device to issue a voice notification for recommending that the user input an execution instruction to execute the predetermined function to the voice control device by voice.

13. The communication system according to claim 1, wherein the server system includes one or a plurality of information processing apparatuses.

14. A server system comprising:
at least one processor, and
at least one memory coupled to the at least one processor and having stored thereon instructions, which when executed by the at least one processor, cause the at least one processor and the at least one memory to cooperate to act as:
a receiving unit configured to receive information that is based on an input from a user who permits execution of at least one function related to the communication apparatus, the execution of the at least one function instructed with a voice input to a voice control device,
wherein the at least one function includes a function of causing the communication apparatus to execute printing, and
an acquisition unit configured to, in a case where a predetermined function is newly added as a function related to the communication apparatus and of which execution is instructed with a voice input to the voice control device, after an input from the user who permits the execution of the at least one function is performed, acquire information that is based on an predetermined voice input that indicates whether to permit the execution of the predetermined function and that has been received by voice from the user by the voice control device.

15. A communication apparatus capable of receiving information transmitted from a server system including
at least one processor, and
at least one memory coupled to the at least one processor and having stored thereon instructions, which when executed by the at least one processor, cause the at least one processor and the at least one memory to cooperate to act as:
a receiving unit configured to receive information that is based on an input from a user who permits execution of at least one function related to the communication apparatus, the execution of the at least one function instructed with a voice input to a voice control device,
wherein the at least one function includes a function of causing the communication apparatus to execute printing;
an acquisition unit configured to, in a case where a predetermined function is newly added as a function related to the communication apparatus and of which execution is instructed with a voice input to the voice control device, after an input from the user who permits the execution of the at least one function is performed, acquire information that is based on a predetermined voice input that indicates whether to permit the execution of the predetermined function and that has been received by voice from the user by the voice control device; and
an execution unit configured to, in a case where the information that is based on the predetermined voice input indicates that the execution of the predetermined function is permitted, execute processing that is based on the predetermined function.

* * * * *